US005758038A

United States Patent [19]

Itoh et al.

[11] Patent Number: 5,758,038

[45] Date of Patent: May 26, 1998

[54] IMAGE FORMING APPARATUS

[75] Inventors: Masahiro Itoh, Odawara; Kenichiro Waki, Kawasaki; Hiroyuki Suzuki, Yokohama; Ryo Inoue, Musashino, all of Japan

[73] Assignee: Canon Kabushiki Kashia, Japan

[21] Appl. No.: 677,280

[22] Filed: Jul. 9, 1996

[30] Foreign Application Priority Data

Jul. 17, 1995 [JP] Japan .................................... 7-201800
May 27, 1996 [JP] Japan .................................... 8-131874

[51] Int. Cl.[6] ............................ G06F 15/00; H04N 1/46; H04N 1/034; B41J 29/38

[52] U.S. Cl. ......................... 395/109; 358/501; 358/502; 358/503; 358/504; 347/3; 347/4; 347/5; 347/6; 347/22; 347/153; 347/187; 399/99; 399/101

[58] Field of Search ............................ 395/109; 358/501, 358/502, 503, 504; 347/3, 5, 6, 7, 8, 16, 17, 19, 22, 4, 24, 114, 153, 187; 399/99, 101

[56] References Cited

U.S. PATENT DOCUMENTS 5,646,718 7/1997 Suwa et al. ............................ 399/350

*Primary Examiner*—Edward L. Coles, Sr.
*Assistant Examiner*—Tia M. Harris
*Attorney, Agent, or Firm*—Fitzpatrick, Cella, Harper & Scinto

[57] ABSTRACT

An image forming apparatus has a plurality of image forming units for forming, on an image receiving member such as a transfer sheet, toner images of a plurality of different colors such as magenta, cyan, yellow and black. Each of the image forming units includes a photosensitive drum serving as an image carrier, a developing device for developing an electrostatic latent image carried by the image carrier to form a color toner image, and a transfer device for transferring the toner image to the image receiving member. The developing device in the image forming unit for forming on the image receiving member the toner image of an (i+1)-th color is of the type capable of simultaneously performing both development and removal of residual toner. The transfer currents $T_i$ and $T_{i+1}$ employed by the transfer units which perform transfer of the toner images of an i-th color and the (i+1)-th color satisfy the following condition (1). The sphericity factor SF of the toner used in at least one of the image forming units, defined by the following equation (2) satisfies the following condition (3):

$$1.0<Ti+1/Ti<1.1 \quad (1)$$

$$SF=\{(\text{diameter of toner having greatest diameter})^2/\text{toner projection area}\}\times(\pi/4) \quad (2)$$

$$1.0\leqq SF\leqq 1.3 \quad (3)$$

9 Claims, 6 Drawing Sheets

TRANSFER CURRENT INCREASE RATIO IN MULTI-TRANSFER OPERATION $T_2/T_1 = 17/15 = 1.13$

TRANSFER CURRENT INCREASE RATIO IN MULTI-TRANSFER OPERATION $T_2'/T_1' = 12.5/12 = 1.04$

IMAGE FORMING APPARATUS

BACKGROUND OF THE INVENTION

1. Field of the Invention

The present invention relates to an image forming apparatus which forms an image by using an image forming process such as an electrostatic recording process or electrophotographic process. More particularly, the present invention relates to an image forming apparatus of the type in which visualized images carried by a plurality of image carriers are transferred in a multiplexed manner to a common image receiving member. The present invention can be embodied not only in the form of an electrophotographic copying apparatus but also as various other types of image forming tools such as a printer, a facsimile apparatus, and so on.

2. Description of the Related Art

In recent years, attempts have been made in the field of image forming apparatuses such as electrophotographic copying apparatuses, aiming at achieving reduction in size, sophistication in functions and ability of color recording.

In addition, there are diversifying considerations such as demands for higher reliability, greater system extendability, ease or elimination of maintenance, and friendliness to human beings and environment.

To cope with these demands, various image forming apparatuses have been proposed to date.

For instance, an image forming apparatus has been proposed which, in order to enable high-speed production of color image output, employs a plurality of photosensitive members and an elongated belt-type conveyor means, so that toner images are successively transferred from the photosensitive members in a multiplexed manner onto a transfer paper sheet which is conveyed by a belt-type conveyor means.

At the same time, a printer has been put to practical use which employs a simultaneous developing/cleaning system which collects residual toner remaining after the image transfer to enable reuse of such toner, in order to reduce the size of the printer while coping with anti-pollution considerations.

A known color copying apparatus employing a multiplexed transfer system using a transfer belt will be described with specific reference to FIG. 7.

The color copying apparatus shown in FIG. 7 has four image forming units and an elongated transfer belt which extends along these four image forming units and which serves as a transfer member conveyor means.

The construction and operation of this color copying apparatus are as follows. The above-mentioned four image forming units are a magenta color image forming unit UM, a cyan color image forming unit UC, an yellow color image forming unit UY and a black color image forming unit UBk. Since these units have an identical construction, only the cyan color image forming unit UC will be specifically mentioned in the following description, as a representative of the four units. The cyan color image forming unit UC has a cylindrical photosensitive member 110C which serves as an electrostatic latent image carrier and which is driven to rotate in the direction of the arrow b. The photosensitive member 110C is adapted to be uniformly charged by a primary charger 112C. The portion of the photosensitive member 110C is brought to an image exposure section 114C and is exposed to an image light, whereby an electrostatic latent image is formed thereon. A developing unit 116C contains, for example, a dual-component developer which is a mixture of magnetic carrier particles and non-magnetic toner particles prepared by crushing. This non-magnetic toner will be referred to as "crushed toner", hereinafter. The electrostatic latent image carried by the portion of the photosensitive member 110C brought to the position where the developing unit 116C is disposed is developed by the developer, whereby a toner image is formed on the photosensitive member 110C. A copy paper sheet 118 serving as the transfer material is fed onto the transfer belt 130 from a sheet feeding section 120. The transfer belt is wound around and stretched between a drive roller 131 and a support roller 132 and is driven to run so as to convey the transfer sheet 118 in synchronization with the rotation of the photosensitive member 110C. A transfer charger 125C then delivers transfer charges to the transfer sheet 118 from the reverse side of the transfer belt 130, so that the toner image is transferred from the photosensitive member 110 onto the transfer sheet 118 by the action of the transfer electric field, which is formed between the transfer belt 130 and the photosensitive member 110C.

The described operation is performed by each of the image forming units, so that the toner images formed on the photosensitive members of these units are successively transferred to the transfer sheet 118 held on the transfer belt 130 in a multiplexed manner in the order of magenta (M), cyan (C), yellow (Y) and black (Bk). Thus, the second color toner image is transferred in a multiplexed manner to the transfer sheet 118 to which the toner of the first color has already been transferred. In order that the toner image of the second color is satisfactorily transferred, therefore, it is necessary that the transfer bias to be created by the electric field generated by the transfer charger for the second charger to be greater than the transfer bias created in the transfer of the toner image of the first color. This also applies to the operations for transferring the toner images of the third and fourth colors. Therefore, multiplexed image transfer as described generally employs a transfer bias, the level of which progressively increases for the successive image transfer operations. For instance, the transfer current T1 for the first color is 15 μA, and the level of the current is progressively increased, e.g., 17 μA for the second color, 19 μA for the third color and 22 μA for the fourth color. Thus, the ratio of the increase of the transfer current ($T_{i+1}/T_i$), i.e., the ratio of the transfer current $T_{i+1}$ used for a color to the transfer current $T_i$ used for the preceding color is as large as 10% or greater. The transfer sheet 118 carrying the multiplexed four color toner images is then moved by the transfer belt 130 into a fixing device 138, whereby the toner images are permanentally fixed to the transfer sheet, i.e., the copy paper sheet, 118.

After the transfer of the toner image from the photosensitive member 110C, any residual toner remaining on the photosensitive member 110C is collected by means of a cleaner 115C. The cleaned surface of the photosensitive member 110C is then moved to a region where a charge-removing operation is performed by a pre-exposure lamp 113C, whereby the surface of the photosensitive member 110C is uniformly initialized to a predetermined potential so as to be subjected to the next image forming cycle. After the delivery of the copy paper sheet 118 to the fixing device 138, the surface of the transfer belt 130 is cleaned by means of a belt cleaner 151.

As described above, the operation of a full-color copying apparatus incorporating a plurality of photosensitive drums essentially requires that the level of the transfer bias is progressively elevated in order to enable four color toner images to be successively transferred to a single transfer sheet without failure. Such a progressive increase in the level of the transfer bias, however, poses the following problems. The toner image of the first color, transferred from the photosensitive drum of the first developing unit, is retained on the transfer sheet by the electrostatic attracting force. However, when the next toner image, i.e., the toner image of the second color, is transferred from the photosensitive drum of the second developing unit downstream of the first unit, part of the toner image of the first color, which already has been transferred to the transfer sheet, tends to be re-transferred to the photosensitive drum of the second developing unit.

Such re-transfer of the toner image degrades the quality of the product full-color image, due to, for example, unevenness of the image, reduction in the image thickness and deviation of color balance. This problem, however, is not so serious in conventional image forming apparatuses having cleaners, because the re-transferred toner can be collected by the cleaner together with the residual toner after the image transfer so as not to cause any undesirable effect on the next image forming cycle.

In the case of a modern cleaner-less image forming apparatus which employs the aforementioned simultaneous development/cleaning system, however, re-transfer of the toner image causes not only the aforesaid problems of image unevenness, reduction in image thickness and deviation of color balance, but also the following problem. Namely, the toner of the first color, re-transferred to the photosensitive drum of the second developing unit is collected into the developing unit for the second color, allowing mixing of the toners of the first and second colors within the developing unit which is intended to form an image of the second color. The mixing of toners of different colors leads to the most critical problem, i.e., an undesirable change in the color taste, in the production of a full-color image.

SUMMARY OF THE INVENTION

Accordingly, an object of the present invention is to provide an image forming apparatus employing a multiplexed image transfer system, wherein the ratio of increase in the transfer current between successive developing units in the multiplexed transfer system is maintained to be small enough to prevent any re-transfer of the toner image.

Another object of the present invention is to provide an image forming apparatus employing a multiplexed image transfer system in which color toner images on image carriers of successive developing units are sequentially transferred in a multiplexed manner to a transfer material, the apparatus being improved to suppress re-transfer of a toner of a first color from the transfer material to the image carrier of the next developing unit which forms a toner image with a toner of a second color.

Still another object of the present invention is to provide an image forming apparatus which is improved to eliminate the risk of mixing of toners of two different colors which otherwise may occur due to invasion of a developing unit for a color by the toner of a different color.

A further object of the present invention is to provide an image forming apparatus which employs a plurality of image carriers so as to attain a high image productivity.

To this end, according to one aspect of the invention, there is provided an image forming apparatus, comprising: a plurality of image forming means for forming, on an image receiving member, toner images of a plurality of different colors, each image forming means including an image carrier, a developing device for developing an electrostatic image on the image carrier to form a toner image, and transfer means for transferring the toner image from said image carrier to the image receiving member; wherein the developing device in the image forming means for forming on the image receiving member the toner image of an (i+1)-th color is of the type capable of removing residual toner from the image carrier; wherein the transfer currents $T_i$ and $T_{i+1}$ employed by the transfer means which perform transfer of the toner images of an i-th color and the (i+1)-th color satisfy the following condition (1); and wherein the sphericity factor SF of the toner used in said image forming means for forming the toner images of an i-th color and the (i+1)-th color, defined by the following equation (2) satisfies the following condition (3):

$$1.0<T_{i+1}/T_i<1.1 \quad (1)$$

$$SF=\{(\text{diameter of toner having greatest diameter})^2/\text{toner projection area}\}\times(\pi/4) \quad (2)$$

$$1.0\leqq SF\leqq 1.3 \quad (3)$$

The above and other objects, features, and advantages of the present invention will become clear from the following description of the preferred embodiments taken in conjunction with the accompanying drawings.

DESCRIPTION OF THE PREFERRED EMBODIMENTS

A first embodiment of the image forming apparatus in accordance with the present invention will be described with reference to the attached drawings.

This embodiment of the image forming apparatus employs the multiplexed image transfer system performed by a plurality of image forming units and a single transfer belt extending along the image forming units and serving as a conveyor for conveying a transfer material. The image forming apparatus also employs a cleaner-less simultaneous development/cleaning process devoid of any specific cleaning device, and operates by using a spherical toner prepared by polymerization. This toner will be simply referred to as "polymerized toner", hereinafter.

Using the spherical polymerized toner, a cleaner-less simultaneous development/cleaning process can be realized to enable re-use of collected toner, for the reasons stated below in connection with FIG. 2, which illustrates the mechanism of adhesion or attraction between the toner and a photosensitive member.

When the toner attaches to a photosensitive member as a result of execution of a developing process, two types of forces primarily act on the toner contacting the surface of the photosensitive member: image force and van der Waals' force. The magnitude of the image force largely depends on the quantity of the charge and the distance. A particle of the conventional crushed toner has both convex and concave portions where and the convex portions are concentrically charged due to triboelectric charging. In contrast, polymerized toner has a smooth spherical or substantially spherical surface so that the entire surface is charged uniformly. The contact between the crushed toner and the surface of the photosensitive member takes place at the convex portion of the toner. Thus, a large quantity of charge exists in a region which is very close to the surface of the photosensitive member. Consequently, a large image force is developed. In contrast, spherical toner such as the polymerized toner makes a substantial "point" contact with the photosensitive member while the quantity of charge in the region near the photosensitive member is small. Consequently, the image force is smaller than that acting on the crushed toner. Van der Waals' force depends on the state of the region which is much more closer to the photosensitive member than that discussed above in connection with the mirror force. This type of force is extremely large when the contact takes place over an area, i.e., when the contact is an areal or surface contact rather than a point contact.

Figure 2:
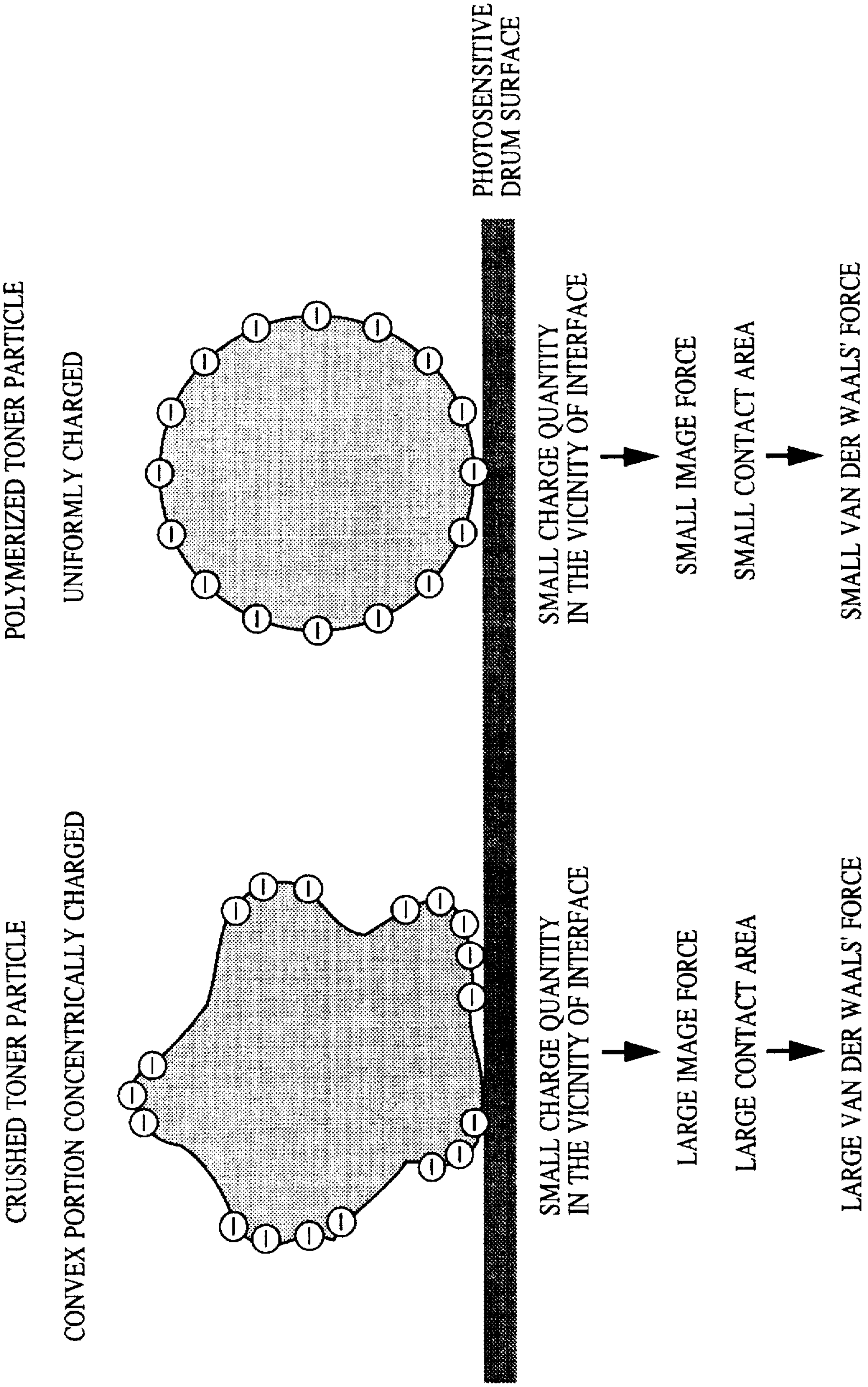
FIG. 2 is an illustration of relationships between the configuration of a toner particle, image force and van der Waals' force.

When the crushed toner is used, many toner particles make contact with areal contact with the photosensitive member in a manner shown in FIG. 2, exhibiting very large van der Waals' force. In contrast, a particle of polymerized toner has a spherical surface contacts with the photosensitive member substantially at a point. Consequently, the van der Waals' force also is small in the case of the polymerized toner as compared with the crushed toner.

Thus, substantially spherical particles of polymerized toner exhibit lower levels of image force and van der Waals' force and, hence, a smaller attracting force acting between such toner particles and the photosensitive member. This means that the amount of residual toner remaining on the photosensitive member after the transfer is small and, at the same time, that a high efficiency is achieved in the collection of the toner into the developing unit during the simultaneous development/cleaning, thus facilitating execution of cleaner-less simultaneous development/cleaning process. Preferably, an external additive, such as silica, is added to the polymerized toner, in order to control fluidity of the toner and chargeability of the toner.

A color copying apparatus employing the simultaneous development/cleaning system, as an embodiment of the present invention, will be described with specific reference to FIG. 1.

Figure 1:
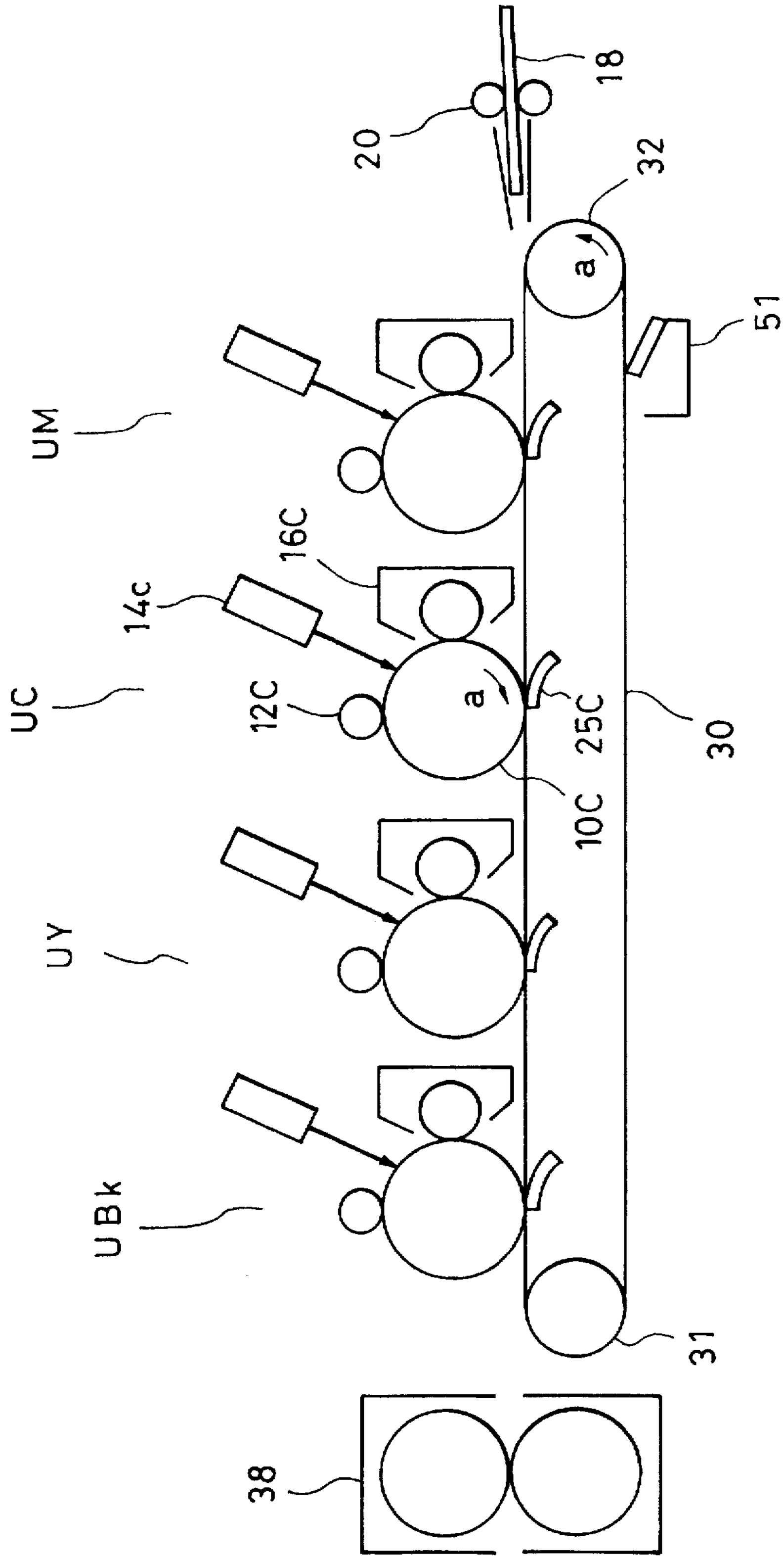
FIG. 1 is a schematic sectional view of a color image forming apparatus to which a first embodiment of the present invention can be applied.

The construction of the color copying apparatus shown in FIG. 1 is as follows.

The apparatus has four image forming units: namely, a magenta color image forming unit UM, a cyan color image forming unit UC, an yellow color image forming unit UY and a black image forming unit UBk. All these units have an identical construction so that the construction will be described on the cyan color image forming unit UC as a representative. The unit UC has a cylindrical photosensitive member 10C adapted to be driven to rotate in the direction of an arrow b at a peripheral speed of 160 mm/sec.

A charging roller 12C is disposed so as to be in contact with the photosensitive member 10C. An image exposure section 14C exposes the photosensitive member 10C at a region downstream of the charging roller 12C as viewed in the direction of rotation of the photosensitive member 10C. A developing/cleaning device 16C is disposed downstream of the image exposure section 14C so as to be juxtaposed to the photosensitive member 10C. Numeral 18 denotes a transfer sheet serving as an image receiving member and fed from a sheet feeding section 20.

A transfer belt 30 runs in the direction of the arrow a at a constant velocity equal to the peripheral velocity of the photosensitive member **10*c* in contact therewith. The transfer belt 30** is an endless belt made of a base material having required levels of mechanical strength and flexibility, such as a resin, e.g., polycarbonate, or a rubber, with conductive particles such as carbon dispersed therein. Preferably, the transfer belt has an electrical resistivity ranging between $10^9\Omega$ and $10^{13}\Omega$ and a thickness of from 0.1 mm to 1 mm.

The transfer belt 30 is wound around and stretched between a drive roller 31 and a supporting roller 32 which in cooperation form a belt driving means. A transfer blade 25C is disposed such that the transfer/conveyor belt 30 is sandwiched between the blade 25C and the photosensitive member 10C at the region where the image transfer is performed. Preferably, the transfer blade 25C has a semiconductor layer of $10^9$ Ωcm to $10^{11}$ Ωcm serving as a base layer, with a surface layer facing the photosensitive member 10C made of a wear-resistant material having high degree of surface smoothness and small friction coefficient, such as a fluororesin or a nylon resin.

A fixing device 38 is disposed adjacent to the drive roller 31 for driving the transfer belt 30. A pre-exposure lamp **13*c* is disposed at a position downstream of the transfer blade 25C but upstream of the primary charger 12C as viewed in the direction of rotation of the photosensitive member 10C**.

The operation of the cyan color image forming unit UC having the described construction is as follows. It will be seen that other units UM, UY and UBk operate in the same manner as the unit UC.

The photosensitive member 10C has a drum-like configuration constituted by a conductive substrate such as of aluminum and a photoconductive layer formed on the surface of the substrate. In operation, the drum-type photosensitive member **10*c* rotates in the direction of an arrow b. The surface of the photosensitive member 10C is uniformly charged to a negative potential as it moves in contact with the charging roller 12C. The uniformly charged portion of the surface of the photoconductive member 10C is then exposed to image light at the image exposure section 14C, whereby an electrostatic latent image corresponding to the image of the original is formed. The developing/cleaning device 16C performs reversal development of the latent image by using a polymerized toner which has been prepared through polymerization and charged negatively, whereby a toner image corresponding to the electrostatic latent image is formed on the surface of the photosensitive member 10C. The toner image thus formed on the surface of the photosensitive member 10C** is transferred therefrom to the copy paper sheet 18 which is fed from the sheet feed section 20 in synchronization with the image formation by the photosensitive member 10C and conveyed by the transfer belt 30 at the same velocity as the peripheral velocity of the rotating photosensitive member 10C.

The described operation is performed by all the image forming units UM, UC, UY and UBk so that the toner images carried by the photosensitive members of these units are sequentially transferred and multiplexed on the transfer sheet 18 which is held by the transfer belt 30. When the printing mode is the full-color mode, the transfer of the color toner images to the transfer sheet 18 is conducted in the order of M, C, Y and Bk. In case of a monochromatic mode, bi-color mode or tri-color mode, selected color toner image alone or is transferred to the transfer sheet or two or three color toner images are transferred in the mentioned order to the transfer sheet 18 in a multiplexed manner.

The transfer sheet 18 to which toner images have been transferred is conveyed by the transfer belt 30 to a fixing device 38 so as to be fixed on the transfer sheet 18 by the effect of heat and pressure.

Residual toner which remains on the photosensitive member 10C after the transfer of the toner image is charged by a charging roller 12C in negative polarity and is collected into the development/cleaning device 16C simultaneously with the development performed by this device 16C. The surface of the transfer belt 30 after the delivery of the copy paper sheet 18 to the fixing device 38 is then cleaned by a belt cleaner 51.

The development/cleaning device 16C has a developing sleeve to which a bias voltage is applied to enable cleaning simultaneously with the development. The potential of the bias voltage is determined to be intermediate the potential of the bright portion and the dark portion of the electrostatic latent image. Consequently, an electric field is formed to cause the toner to move from the developing sleeve to the bright portion of the photosensitive member and, at the same time, an electric field is formed to collect the residual toner from the dark portion of the photosensitive member to the developing sleeve.

A detailed description will be given of the image forming process performed by the electrophotographic apparatus having the illustrated construction, in particular in regard to the multiplexed transfer and re-transfer of the images, with specific reference to FIGS. 3 and 4. Operations down to the transfer of the color toner images are basically the same as those described before so that they are not described in detail.

Figure 3:
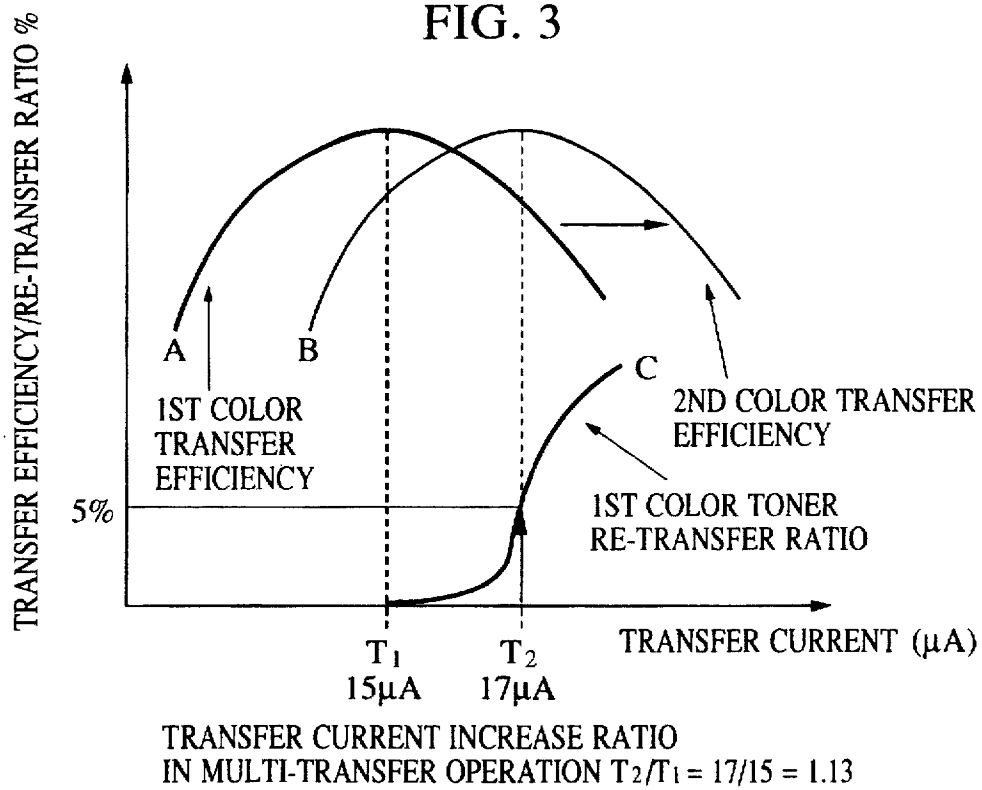
FIG. 3 is a graph illustrating the relationship between the transfer current and transfer efficiency and the relationship between the transfer current and re-transfer ratio, as observed when a conventional crushed toner is used.
Figure 4:
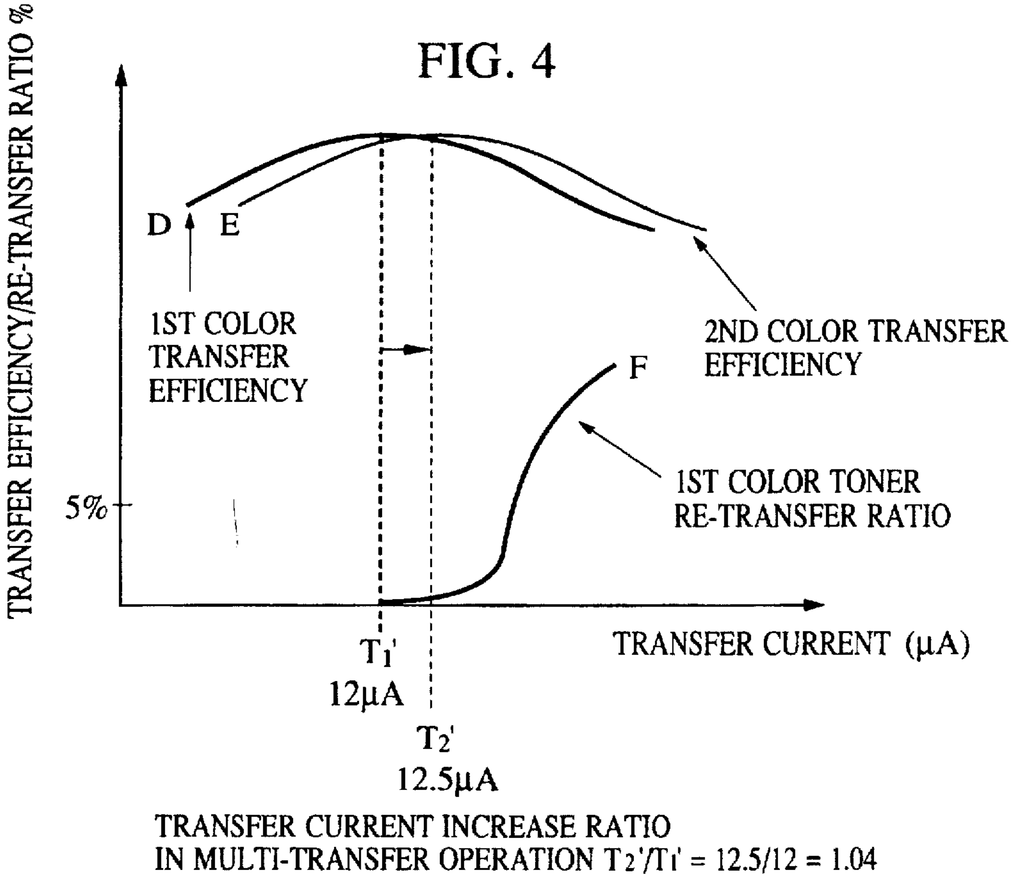
FIG. 4 is a graph illustrating the relationship between the transfer current and transfer efficiency and the relationship between the transfer current and re-transfer ratio, as observed when a spherical polymerized toner in accordance with the present invention is used.

FIGS. 3 and 4 are graphs showing dependencies of the transfer efficiency and re-transfer ratio on the transfer current, which is the electrical current supplied from a power supply to the transfer member. As indicated by curve A in FIG. 3, when the crushed toner as shown in FIG. 3 is used, the efficiency of transfer of the toner image of the first color progressively increases in accordance with an increase in the transfer current T1 and, after exhibiting a peak at about $T_1$=15 μA, starts to decrease in accordance with further increase in the transfer current $T_1$.

The change in the transfer efficiency indicated by the curve A is attributable to the following fact. When the transfer current is small, the image transfer force acting on the toner is exceeded by the force which acts to retain the toner image on the photosensitive member, e.g., the force produced by the electric field of the electrostatic image or the adhesion between the toner and the photosensitive member, so that part of the toner remains on the photosensitive member without being transferred to the transfer sheet. The amount of the toner which remains without being transferred decreases when the transfer current increases. However, when the transfer current is increased beyond a certain level, electrostatic discharge takes place when the transfer sheet is separated from the photosensitive member so as to reverse the polarity of electrostatic charge of part of the toner, so as to increase the proportion of the toner which remains on the photosensitive member without being transferred. The electrostatic discharge also causes the aforesaid re-transfer which is such a phenomenon that the toner which has been transferred to the transfer sheet is again transferred from the transfer sheet to the photosensitive member of the next image forming unit.

It is thus understood that the peak of the transfer efficiency depends on the balance between the force which serves to prevent transfer of the toner from the photosensitive member and the degree of ease of reversal of the of electrostatic charging polarity of the toner which occurs due to electrostatic discharge generated when the transfer sheet is separated from the photosensitive member.

When the toner image of the second color is transferred so as to be multiplexed with the toner image of the first color, which has already been transferred to the transfer sheet, the transfer characteristic is shifted as indicated by a curve B such that the peak of the transfer efficiency appears at a level of the transfer current which is about 2 μA greater than that of the curve A, i.e., at about $T_2$=17 μA. It will be seen that, in order to obtain sufficiently high levels of transfer efficiency in the multiplexed transfer of color toner images, it is necessary that the transfer current is increased in a stepped manner such that the transfer of the toner image of the second color is conducted with a transfer current greater than that used in the transfer of the toner image of the first color, the third color tone image is transferred with a transfer current greater than that used in the transfer of the second color toner image, and so forth.

Namely, when a color toner image is to be transferred and superposed to a toner image, which has already been transferred, a stronger transfer electric field has to be formed to successfully transfer the color toner image overcoming the influence of the toner of the preceding color which already exists on the transfer sheet. Such a stronger transfer electric field is necessary also for the reason that the transfer of the crushed toner, which is in contact with the photosensitive member and which exhibits a large force for attaching to the photosensitive member as stated before, requires a correspondingly large transfer force in order that such crushed toner is successfully transferred from the photosensitive member to the transfer sheet.

The inventors have found that, when the transfer current $T_2$ for the toner image of the second color is set to 17 μA, not ever a small part of the toner of the first color, which already has been transferred to the transfer sheet 18, is undesirably transferred from the transfer sheet 18 to the photosensitive drum of the image forming unit of the second color, due to electrostatic discharge which occurs when the transfer sheet is separated from the photosensitive drum. The proportion of the toner of the first color back from the transfer sheet, i.e., the re-transfer ratio, is as large as about 5% as shown by curve C in FIG. 3.

The inventors have conducted various experiments in regard to multiplexed image transfer with crushed color toners and have found that the transfer current $T_2$ for maximizing the efficiency of the transfer of the toner image of the second color is generally about 10% or more greater than the transfer current $T_1$ in addition to providing the peak of the efficiency of transfer of the toner image of the first color.

When such a large increase of the transfer current is employed, however, about 5% of the toner of the first color is undesirably transferred from the transfer sheet to the photosensitive drum of the image forming unit for the second color, as described above in connection with the curve C in FIG. 3. This tendency was commonly observed in all modes of the experiments. It is therefore established that the re-transfer ratio increases in accordance with the increase in the transfer current. In particular, the inventors have confirmed that the re-transfer ratio drastically increases when the ratio ($T_{i+1}/T_i$) between the level of the transfer current $T_{i+1}$ used in the transfer of the toner image of the (i+1)-th color and the level of the transfer current $T_i$ used in the transfer of the i-th color is increased beyond 1.10.

Similar facts were observed also in regard to the image transfer operations for transferring the toner images of the third and fourth colors, although not described in detail.

The inventors have conducted experiments using a polymerized toner, under the same conditions as those of the experiments conducted by using the crushed toner. The polymerized toner was prepared by an aqueous suspension polymerization technique which provided spherical toner particles exhibiting a small attaching force.

In this case, the efficiency of transfer of the toner image of the first color showed a peak at $T_1'=12$ μA as shown by a curve D in FIG. 4. Thus, the level of the transfer current, which maximizes the transfer efficiency for the toner image of the first color, was appreciably lower than that observed when the crushed toner was used. As to the transfer of the toner image of the second color using the spherical toner, the transfer efficiency was maximized at the transfer current $T_2'$ of 12.5 μA, as indicated by a curve E in FIG. 4. Thus, the ratio of increase in the transfer current was as small as about 4%, and, with such a small ratio of increase in the transfer current, no substantial re-transfer was observed as will be seen from a curve F in FIG. 4.

Similar facts were observed also in regard to the image transfer operations for transferring the toner images of the third and fourth colors, although not described in detail.

Figure 5:
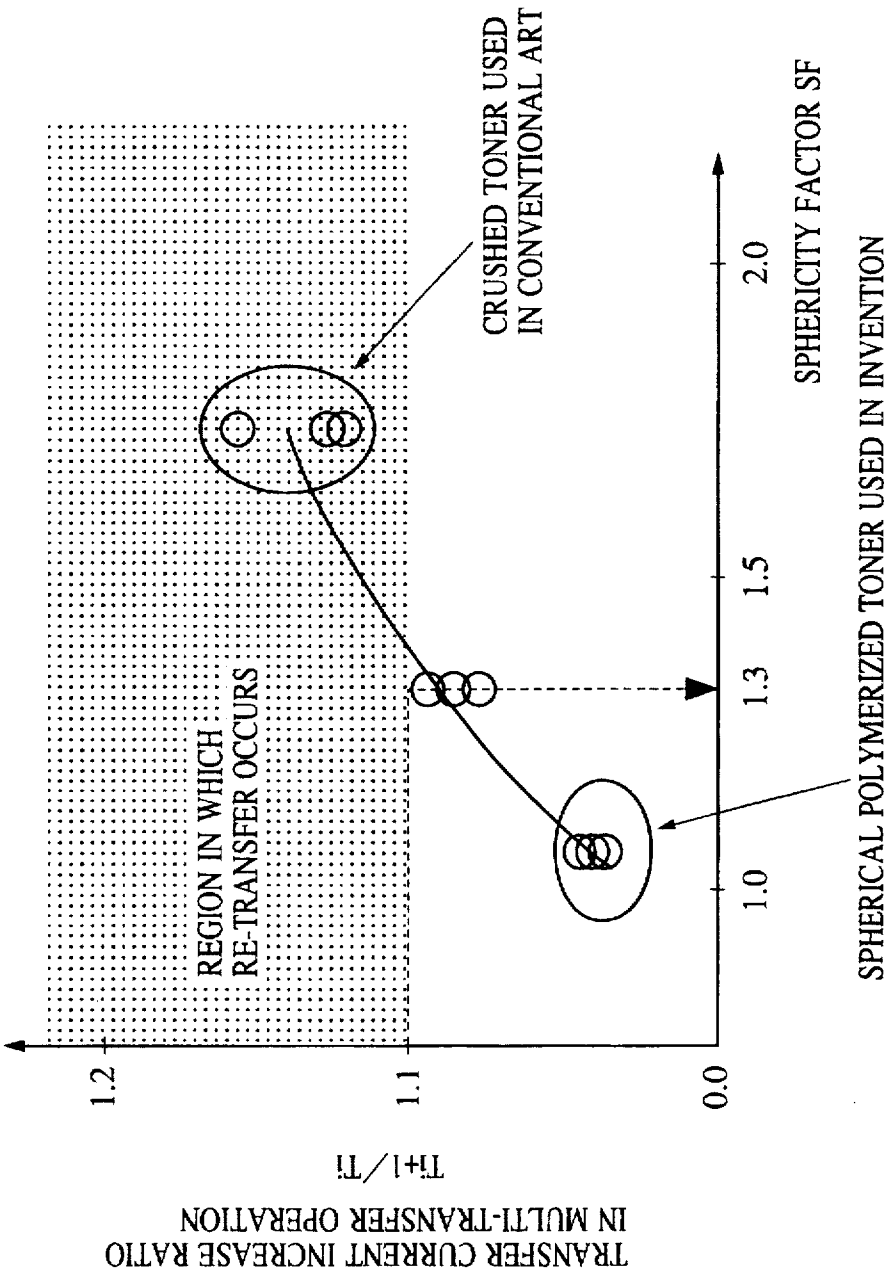
FIG. 5 is a diagram showing the relationship between the sphericity factor SF of the toner particle and the ratio of increase of transfer current and showing also how occurrence of re-transfer is related to the sphericity factor SF.

Experiments were also conducted by using a variety of values of the sphericity factor, in order to examine the dependency of the ratio of increase of the transfer current and, hence, the dependency of the ratio of occurrence of re-transfer on the configuration of the toner particle. The results are shown in FIG. 5.

For the purpose of quantitative evaluation of the toner sphericity, the toner particles were measured and quantitated in terms of sphericity factor SF, which was determined as follows.

300 or more toner particles were sampled by using a field-emission scanning electron microscope (Model S-800) produced by Toshiba Corp. and were measured by an image processing apparatus Luzex 3 manufactured by Nireco Corporation. The spherical factor SF was then determined in accordance with the following definition.

$$\text{Sphericity Factor } (SF)=\{(MX\ LNG)^2/\text{AREA}\}\times(\pi/4)$$

where, MX LNG represents the diameter of the toner particle having the greatest diameter, and AREA represents the projection area of the toner.

From the results shown in FIG. 5, it is understood that there exists a correlation between the sphericity factor SF of the toner and the ratio of increase of the transfer current in the multiplexing transfer of toner images of plural colors. More specifically, the ratio of an increase of the transfer current, which is required for achieving high transfer efficiency increases, accompanied by an increase in the ratio of re-transfer, as the amount of deviation of the sphericity factor SF from 1.0 increases, i.e., as the toner particle configuration becomes more and more indefinite. As explained before, a drastic increase in the re-transfer ratio in multiplexing color tone image transfer occurs when the ratio of increase of the transfer current is increased beyond 1.10. The inventors have found that this value of the transfer current ratio is reached when the sphericity factor is around 1.3 or greater.

According to the present invention, the condition of $1.0<T_{i+1}/T_i<1.1$ is obtained so as to substantially eliminate re-transfer of the color toners, by virtue of use of the toners having sphericity factors SF of from 1.0 to 1.3, thus ensuring production of multi-color image having no degradation of image which otherwise may be caused by mixing of toners of different colors.

Figure 6:
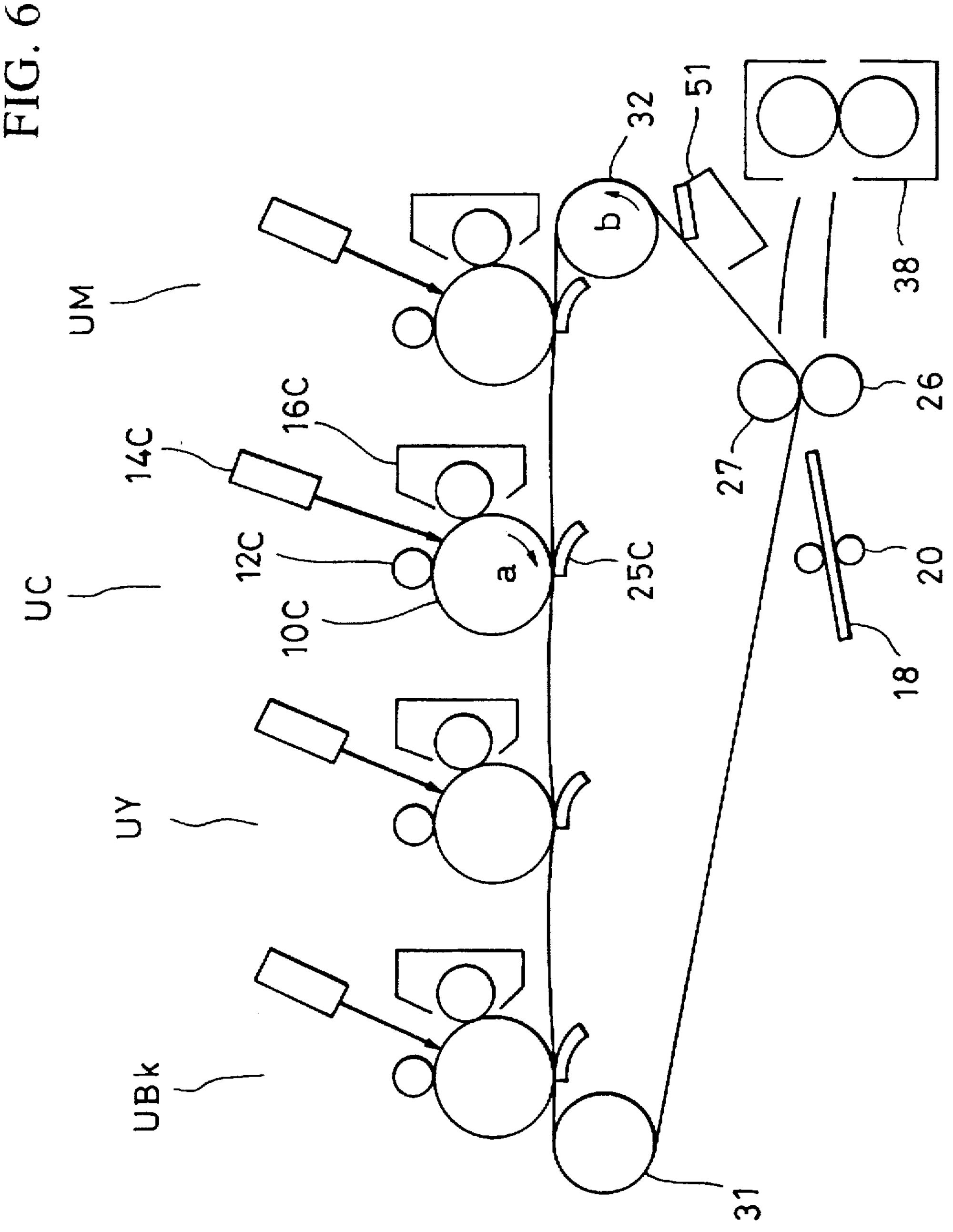
FIG. 6 is a schematic sectional view of a color image forming apparatus to which a second embodiment of the present invention is applicable.
Figure 7:
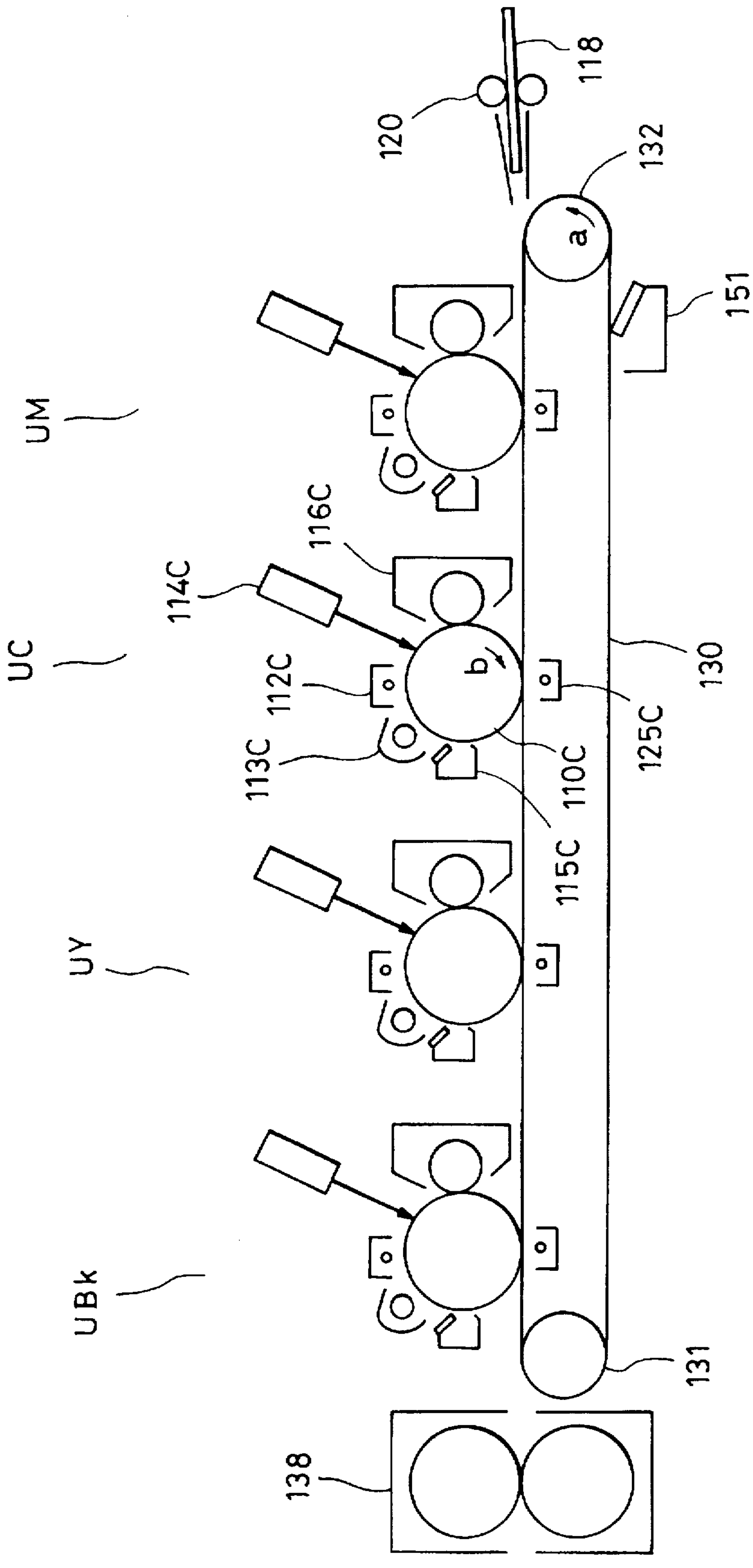
FIG. 7 is a schematic sectional view of a conventional color image forming apparatus.

A second embodiment of the present invention will now be described with specific reference to FIG. 6. As is the case of the first embodiment, an image forming apparatus as the second embodiment employs four image forming units: namely, a magenta color image forming unit UM, a cyan color image forming unit UC, an yellow color image forming unit UY and a black color image forming unit UBk, each unit having a unitary construction including a photosensitive drum, a primary charger, an exposure device, a development/cleaning device and a pre-exposure device. This embodiment employs polymerized toners having sphericity factors of about, i.e., substantially spherical toner particles, formed through polymerization.

In the first embodiment described before, a transfer sheet as the image receiving member is conveyed by the transfer belt through successive image forming units so that toner images of different colors are multiplexed, successively transferred, and multiplexed on the transfer sheet. In contrast, the second embodiment employs an intermediate transfer member serving as an image receiving member to which toner images of different colors are successively transferred in a multiplexed manner, and the multiplexed color toner image is then transferred from this intermediate transfer member to a transfer paper sheet. More specifically, as shown in FIG. 6, a belt-type intermediate transfer member 50 is wound around and stretched between a drive roller 32 and a supporting roller 31, and is adapted to pass through a nip between a backup roller 27 and a secondary transfer roller 26. As the belt-type intermediate transfer member 50 runs past the successive image forming units, toner images of different colors are successively transferred from the photosensitive drums of the successive image forming units in a multiplexed manner so as to be superposed on the intermediate transfer member 50. The thus-formed multiplexed toner image formed on the intermediate transfer member is then transferred to a transfer paper sheet 18 fed by a sheet feed roller 20 as the transfer paper sheet passes through the nip between the backup roller 27 and the secondary transfer roller 26 together with the portion of the intermediate transfer member carrying the image. The color toner image thus transferred to the transfer paper sheet 18 is fixed thereto as the sheet 18 is moved through a fixing device 38. In this embodiment, the peripheral velocity of the photosensitive drums of the respective image forming unit is 80 mm/sec.

The belt-type intermediate transfer member is a flexible endless belt having a base layer of urethane rubber ($10^3$ to $10^4$ Ωcm) and a dielectric surface layer of PTFE (polytetrafluoroethylene) ($10^{14}$ Ωcm or greater) formed on the base layer. Other portions of the image forming apparatus of the second embodiment are materially the same as those of the first embodiment, so that the same reference numerals are used to denote such portions and a detailed description thereof is omitted.

A description will now be given as to the multiplexing image transfer operation performed in the second embodiment.

A test image forming operation was conducted by using the image forming apparatus of the second embodiment. The image transfer efficiency in the transfer of the first color toner image formed by the image forming unit UM showed its peak with the transfer current of $T_1$=8 μA. The peak of the efficiency of image transfer for the second color toner image formed by the image forming unit UC appeared at T2=8.5 μA. Similarly, the peaks of efficiencies of image transfer of the third and fourth color toner images formed by the image forming units UY and UBk were observed at T3=9 μA and T4=9.5 μA, respectively. Thus, the ratio ($T_{i+1}/T_i$) of increase of the transfer current was 1.07 which meets the requirements of the ratio ($T_{i+1}/T_i$) being less than 1.1. Consequently, no substantial re-transfer of toner was observed, and images of good quality were stably obtained without suffering from degradation of image quality and mixing of different colors. In addition, the present invention also contributes to reduction in the scale and power of the bias power supply, while facilitating the separation of the sheets, by virtue of the reduced ratio ($T_{i+1}/T_i$) of increase of the transfer current. It was also confirmed that the condition of ($T_{i+1}/T_i$) being less than 1.1 can be met when the sphericity factor SF is determined to be from 1.0 to 1.3.

Although the embodiments described hereinbefore employs a spherical toner formed through an aqueous suspension polymerization technique, the present invention does not exclude the use of other types of toners, such as a polymerized toner prepared through a different polymerization process, e.g., emulsifying polymerization method, as well as a toner prepared by crushing and then spheroidized to have a sphericity factor of 1.0 to 1.3.

The present invention does not essentially require that all the image forming units are of the cleaner-less simultaneous developing/cleaning type, although each of the first and second embodiments employ four image forming units all of which are of the cleaner-less simultaneous developing/cleaning type. Namely, the advantage of the present invention can be enjoyed if at least one of a plurality of image forming units is of the cleaner-less simultaneous developing/cleaning unit. Provision of four image forming units is also illustrative and the present invention can be applied provided that at least two image forming units are used. For instance, the arrangement may be such that only the image forming unit for the (i+1)-th color is formed as the cleaner-less simultaneous developing/cleaning type, while all other image forming units are of an ordinary type in which a developing device and a cleaning device are constructed separately, provided that the requirement of $1.0<T_{i+1}/T_i<1.1$ is met.

Furthermore, the present invention does not pose any restriction in regard to the configuration and type of the members for creating the transfer electric field.

Although the invention has been described through its specific form, it is to be understood that the described embodiments are only illustrative and various changes and modifications may be imparted thereto without departing from the scope and spirit of the present invention which are limited solely by the appended claims.

What is claimed is:

1. An image forming apparatus, comprising:

a plurality of image forming means for forming, on an image receiving member, toner images of a plurality of different colors, each image forming means including an image carrier, a developing device for developing an electrostatic image on said image carrier to form a toner image, and transfer means for transferring the toner image from said image carrier to said image receiving member;

wherein said developing device in said image forming means for forming on said image receiving member the toner image of an (i+1)-th color is of the type capable of removing residual toner from said image carrier;

wherein the transfer currents $T_i$ and $T_{i+1}$ employed by the transfer means which perform transfer of the toner images of an i-th color and the (i+1)-th color satisfy the following condition (1); and wherein the sphericity factor SF of the toner used in said image forming means for forming the toner images of an i-th color and the (i+1)-th color, defined by the following equation (2) satisfies the following condition (3):

$$1.0<T_{i+1}/T_i<1.1 \quad (1)$$

$$SF=\{(\textit{diameter of toner having greatest diameter})^2/\text{toner projection area}\}\times(\pi/4) \quad (2)$$

$$1.0\leqq SF\leqq 1.3 \quad (3).$$

2. An image forming apparatus of claim 1, wherein said image receiving member comprises a transfer paper sheet.

3. An image forming apparatus of claim 1, wherein said image receiving member comprises an intermediate transfer member to which the toner images are transferred from said image carrier in superposition, and the superposed toner image formed on said intermediate transfer member is further transferred to a transfer material.

4. An image forming apparatus of claim 2, further comprising an image receiving member carrying member for carrying and conveying said image receiving member to image transfer positions of the respective image forming means.

5. An image forming apparatus of claim 4, wherein said image receiving member carrying member comprises a belt-type member.

6. An image forming apparatus of claim 1, wherein said toner comprises a polymerized toner prepared through polymerization.

7. An image forming apparatus of claim 1, wherein said developing device of each said image forming means is capable of removing toner remaining on the associated image carrier, and wherein when toner images of N colors are transferred to said image receiving member, any of the image forming means of i=1, 2, . . . , N−1 meets said condition (1).

8. An image forming apparatus of claim 1, wherein said developing device in said image forming means for forming the toner image of the (i+1)-th color is capable of simultaneously performing both developing operation and cleaning operation.

9. An image forming apparatus of claim 7, wherein said developing device in each of said plurality of image forming means is capable of simultaneously performing both developing operation and cleaning operation.

* * * * *

UNITED STATES PATENT AND TRADEMARK OFFICE

CERTIFICATE OF CORRECTION

PATENT NO. : 5,758,038

DATED : May 26, 1998

INVENTOR(S) : MASAHIRO ITOH ET AL.

It is certified that error appears in the above-identified patent and that said Letters Patent is hereby corrected as shown below:

On the title page: Item

[73] AT ASSIGNEE:

"Canon Kabushiki Kaisha, Tokyo" should read --Canon Kabushiki Kaisha, Tokyo, Japan--.

COLUMN 1:

Line 55, "an yellow" should read --a yellow--.
Line 59, "description," should read --description--.

COLUMN 3:

Line 37, "taste," should read --taste--.

COLUMN 5:

Line 18, "where and" should read --where--.
Line 42, "has a" should read --has--.

COLUMN 6:

Line 1, "an yellow" should read --a yellow--.

COLUMN 8:

Line 53, "ever" should read --even--.

COLUMN 9:

Line 22, "toner," should read --toner--.

UNITED STATES PATENT AND TRADEMARK OFFICE

CERTIFICATE OF CORRECTION

PATENT NO. : 5,758,038

DATED : May 26, 1998

INVENTOR(S) : MASAHIRO ITOH ET AL.

It is certified that error appears in the above-identified patent and that said Letters Patent is hereby corrected as shown below:

COLUMN 10:

Line 26, "an yellow" should read --a yellow--.

Signed and Sealed this

Fifth Day of January, 1999

Attest:

*Attesting Officer*

*Acting Commissioner of Patents and Trademarks*